(12) United States Patent
Zhao et al.

(10) Patent No.: US 11,490,033 B2
(45) Date of Patent: *Nov. 1, 2022

(54) VIDEO GENERATING METHOD, APPARATUS, ELECTRONIC DEVICE AND COMPUTER STORAGE MEDIUM

(71) Applicant: BEIJING MICROLIVE VISION TECHNOLOGY CO., LTD, Beijing (CN)

(72) Inventors: Mingwei Zhao, Beijing (CN); Haidong Chen, Beijing (CN)

(73) Assignee: BEIJING MICROLIVE VISION TECHNOLOGY CO., LTD, Beijing (CN)

( * ) Notice: Subject to any disclaimer, the term of this patent is extended or adjusted under 35 U.S.C. 154(b) by 130 days.

This patent is subject to a terminal disclaimer.

(21) Appl. No.: 16/978,380

(22) PCT Filed: Dec. 26, 2018

(86) PCT No.: PCT/CN2018/124064
§ 371 (c)(1),
(2) Date: Sep. 4, 2020

(87) PCT Pub. No.: WO2020/077854
PCT Pub. Date: Apr. 23, 2020

(65) Prior Publication Data
US 2021/0321046 A1    Oct. 14, 2021

(30) Foreign Application Priority Data
Oct. 19, 2018   (CN) .......................... 201811223744.4

(51) Int. Cl.
*H04N 5/265*   (2006.01)
*G11B 27/036*  (2006.01)
(Continued)

(52) U.S. Cl.
CPC .......... *H04N 5/265* (2013.01); *G11B 27/036* (2013.01); *H04N 5/0675* (2013.01);
(Continued)

(58) Field of Classification Search
CPC .. H04N 5/265; H04N 5/0675; H04N 5/23293; H04N 5/2621; H04N 5/2624;
(Continued)

(56) References Cited

U.S. PATENT DOCUMENTS

2009/0086013 A1*  4/2009  Thapa ................... H04L 65/604
                                                  348/E7.083
2012/0081530 A1   4/2012  Kerr et al.
(Continued)

FOREIGN PATENT DOCUMENTS

CN    103928039 A    7/2014
CN    105338369 A    2/2016
(Continued)

OTHER PUBLICATIONS

International Patent Application No. PCT/CN2018/124064; Int'l Search Report; dated Jul. 5, 2019; 3 pages.

*Primary Examiner* — Nicholas G Giles
(74) *Attorney, Agent, or Firm* — BakerHostetler

(57) ABSTRACT

Embodiments of the present disclosure provide a video generating method, apparatus, electronic device, and computer storage medium. The method comprises: receiving a user's video capturing operation through a video playing interface of an original video; in response to the video capturing operation, superimposing a video capturing window on the video playing interface, capturing a user's video, and displaying the user's video through the video capturing window; and combining the user's video with the original video to obtain a combined video. According to the embodiments of the present disclosure, the combined video by (Continued)

Receiving a user's video capturing operation through a video playing interface of an original video — S110

In response to the video capturing operation, superimposing a video capturing window on the video playing interface, capturing a user's video, and displaying the user's video through the video capturing window — S120

Combining the user's video with the original video to obtain a combined video — S130 combining the user's video with the original video may be obtained conveniently and quickly, and the operation process is simple and fast, and the actual application requirements of the user can be better meet, which improves the users' interactive experience.

14 Claims, 9 Drawing Sheets

(51) Int. Cl.
    *H04N 5/067*     (2006.01)
    *H04N 5/232*     (2006.01)
    *H04N 5/262*     (2006.01)

(52) U.S. Cl.
    CPC ....... *H04N 5/23293* (2013.01); *H04N 5/2621* (2013.01); *H04N 5/2624* (2013.01); *H04N 5/2628* (2013.01); *G09G 2340/10* (2013.01)

(58) Field of Classification Search
    CPC . H04N 5/2628; G11B 27/036; G09G 2340/10
    See application file for complete search history.

(56) References Cited

U.S. PATENT DOCUMENTS

2017/0068380 A1     3/2017   Hong et al.
2020/0321029 A1*   10/2020   Cui .................... H04N 5/23293

FOREIGN PATENT DOCUMENTS

| | | |
|---|---|---|
| CN | 105898133 A | 8/2016 |
| CN | 106028137 A | 10/2016 |
| CN | 107920274 A | 4/2018 |
| CN | 108566519 A | 9/2018 |
| CN | 108989692 A | 12/2018 |
| CN | 109089059 A | 12/2018 |
| JP | 2003-009114 A | 1/2003 |
| JP | 2012-530404 A | 11/2012 |
| JP | 2013-145983 A | 7/2013 |
| JP | 2016-163236 A | 9/2016 |

* cited by examiner

VIDEO GENERATING METHOD, APPARATUS, ELECTRONIC DEVICE AND COMPUTER STORAGE MEDIUM

CROSS-REFERENCE TO RELATED APPLICATION

This application is the U.S. National Stage of International Application No. PCT/CN2018/124064, filed on Dec. 26, 2018, which is based on and claims priority to Chinese Patent Application No. 201811223744.4, filed on Oct. 19, 2018, in the Chinese National Intellectual Property Administration, the disclosure of which is incorporated by reference herein its entity.

TECHNICAL FIELD

The present disclosure relates to video processing techniques, and in particular, to a video generating method, apparatus, electronic device, and computer storage medium.

BACKGROUND ART

When browsing videos on a platform where a user can interact through the videos, the user may be interested in certain videos, or has some ideas of himself. At this point, the user will also record some videos based on the videos they are interested in to express his ideas, and then upload them to a video interactive platform so that more people may know his ideas.

In prior art, when a user wants to capture an interactive video based on a certain video on the video platform, the user usually firstly downloads and save the original video on the video platform, and then completes the recording and editing of the interactive video using some professional video tools, and later uploads the completed interactive video onto the video platform. However, the entire interactive video production process cannot be completed only via the video platform, thereby reducing the user's interactive experience.

As can be seen that, the existing interactive video combining manner is complicated, and the user's interactive experience is poor, which cannot meet the actual application requirements of the user.

SUMMARY OF THE INVENTION

In a first aspect, the present disclosure provides a video generating method, the method comprising:
receiving a user's video capturing operation through a video playing interface of an original video;
in response to the video capturing operation, superimposing a video capturing window on the video playing interface, capturing a user's video, and displaying the user's video through the video capturing window; and
combining the user's video with the original video to obtain a combined video.

In a second aspect, the present disclosure provides an electronic device, the electronic device comprising:
a processor and a memory,
wherein the memory is used to store computer operation instructions; and
the processor is used to execute the method as shown in any of the first aspects of the present disclosure by calling the computer operation instructions.

In a third aspect, the present disclosure provides a computer storage medium, the computer storage medium stores at least one instruction, at least one program, a code set, or a set of instructions, the at least one instruction, at least one program, the code set, or the set of instructions is loaded and executed by a computer to implement the method as shown in any of the first aspects of the present disclosure.

THE DESCRIPTION OF DRAWINGS

In order to more clearly illustrate the technical solutions in the embodiments of the present disclosure, the drawings to be used in the description of the embodiments of the present disclosure will be briefly described below.

DETAILED DESCRIPTION OF THE PREFERRED EMBODIMENT

Figure 1:
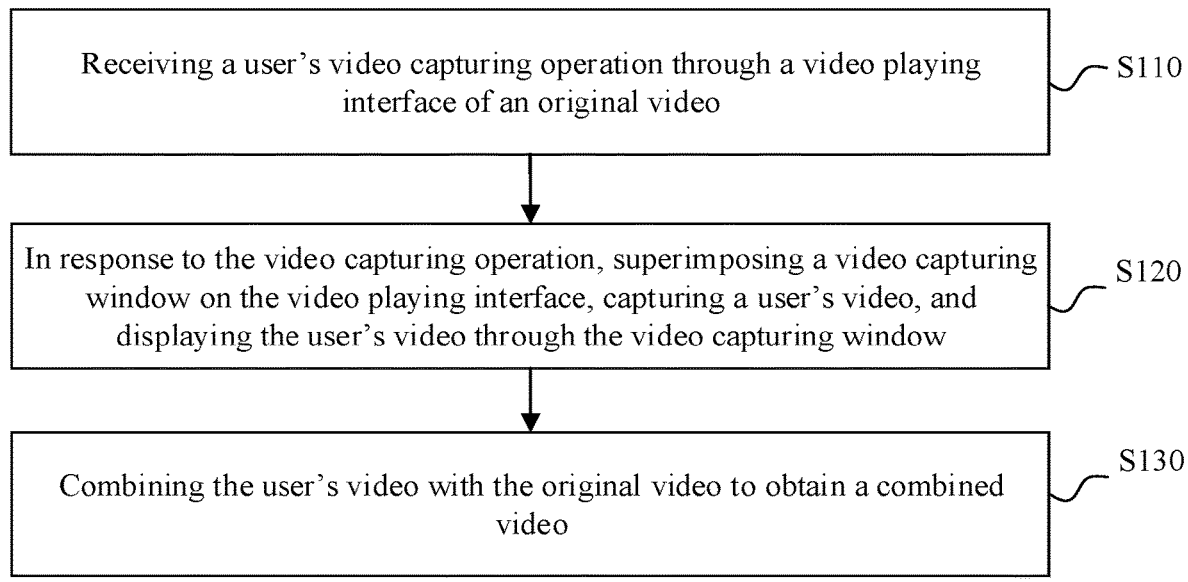
FIG. 1 is a schematic flowchart diagram of a video generating method according to an embodiment of the present disclosure.

The embodiments of the present disclosure will be described in detail hereinafter. The examples of these embodiments have been illustrated in the accompanying drawings throughout which same or similar reference numerals refer to same or similar elements or elements having same or similar functions. The embodiments described with reference to the accompanying drawings are illustrative, merely used for explaining the present disclosure and should not be regarded as any limitations thereto.

It should be understood by those skilled in the art that singular forms "a", "an", "the" and "said" may be intended to include plural forms as well, unless otherwise stated. It should be further understood that terms "comprise/comprising" used in this specification specify the presence of the stated features, integers, steps, operations, elements and/or components, but not exclusive of the presence or addition of one or more other features, integers, steps, operations, elements, components, and/or combinations thereof. It should be understood that, when a component is referred to as being "connected to" or "coupled to" another component, it may be directly connected or coupled to other elements or provided with intervening elements therebetween. In addition, "connected to" or "coupled to" as used herein may comprise wireless connection or wireless coupling. As used herein, the term "and/or" comprises all or any of one or more associated listed items or combinations thereof.

The technical solutions of the present disclosure and how the technical solutions of the present disclosure solve the above technical problems will be described in detail below with reference to specific embodiments. The following specific embodiments may be combined with each other, and the same or similar concepts or processes may not be described in some embodiments any more. Embodiments of the present disclosure will be described below with reference to the accompanying drawings.

An embodiment of the present disclosure provides a video generating method. As shown in FIG. 1, the method may comprise:

Step S110: receiving a user's video capturing operation through a video playing interface of an original video;

Step S120: in response to the video capturing operation, superimposing a video capturing window on the video playing interface, capturing a user's video, and displaying the user's video through the video capturing window; and Step S130: combining the user's video with the original video to obtain a combined video.

According to the embodiments of the present disclosure, the user can obtain the combined video combining the user's video with the original video only by performing the related operations of the user's video capturing on the video playing interface, and the operation process is simple and fast. Since the user's video may reflect the user's impression, comments or viewing reflection to the original video, the user can conveniently represent his or her opinions or reflection on the original video, which can better meet the user's requirements for actual applications and improving the user's interactive experience.

The video generating method provided by an embodiment of the present disclosure is described in detail below.

In step S110, the user's video capturing operation is received through the video playing interface of the original video.

Wherein, the video capturing operation indicates that the user wants to start capturing the user's video based on the original video on the video playing interface, that is, the action for the user to trigger to start capturing the user's video. The specific form of the operation may be configured according to the needs, for example, may be a triggering action of the user at a specified operation position on the interface of the application of the client end. Wherein, the video playing interface may be used for interaction between the electronic device and the user, and the user's related operations to the original video, for example, operations such as sharing the original video or performing a combining, may be received through the interface.

In actual applications, the user's video capturing operations may be received through a relevant video capturing triggering identifier of the client end. Wherein, the specific format of the triggering identifier may be configured according to actual needs, for example, the identifier may be a specified triggering button or input box on the interface of the client end, or may be a user's voice instruction. In an embodiment of present disclosure, for example, it may be a virtual button "combine" ("co-capture", "superimpose", "re-act" or "re-post") or "capture" displayed on the application interface of the client end, and the operation of the user clicking the button may be the user's video capturing operation.

In step S120, in response to the video capturing operation, the video capturing window is superimposed on the video playing interface, the user's video is captured, and the user's video is displayed through the video capturing window.

In an alternative embodiment of the present disclosure, the above video capturing operation may comprise a video capturing triggering operation and a video starting-capturing operation. In this case, the solution may comprise:
receiving a user's video capturing triggering operation through the video playing interface of the original video;
in response to the video capturing triggering operation, superimposing the video capturing window on the video playing interface, capturing the user's video, and displaying the user's video through the video capturing window;
receiving the user's video starting-capturing operation through the video playing interface; and
in response to the video starting-capturing operation, capturing the user's video and displaying the user's video through the video capturing window.

In other words, the user's video capturing operation may be one operation or multiple operations. In actual applications, the corresponding configuration may be performed according to actual needs. Wherein, the video capturing triggering operation indicates that the user wants to capture the user's video based on the original video on the video playing interface, that is, the action for the user to trigger to start capturing the user's video, and the specific form of the operation may be configured according to the needs, for example, may be a triggering action of the user at the specified operation position on the interface of the application of the client end.

The video starting-capturing operation indicates that the user wants to start capturing the user's video through the video capturing window, that is, the action for the user to trigger to start capturing the user's video, and when the operation is received, the capturing of the user's video is started. Wherein, the specific form of the operation may be configured according to the needs, for example, may be a virtual button "start capturing" on the interface of the application of the client end of the user.

It should be noted that, in the actual applications, regardless of whether the user's video capturing operation is one operation or multiple operations, the specific implementation form of acquiring each operation may be configured according to actual needs, and the embodiment of the present disclosure is not limited.

Figure 2:
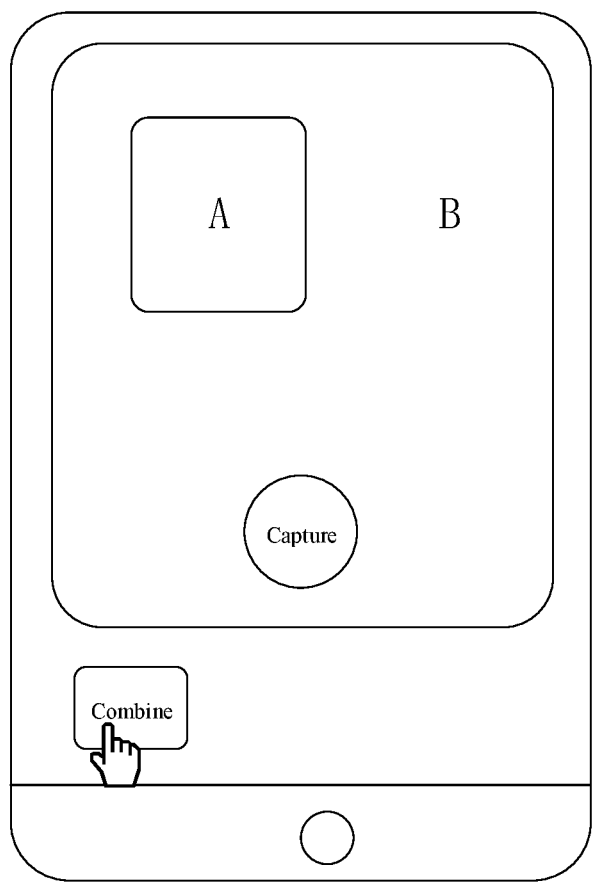
FIG. 2 is a schematic diagram of a video playing interface according to an embodiment of the present disclosure.

As an example, a video playing interface of the original video of the application at the client end in the electronic device is shown in FIG. 2. The virtual button "combine" displayed on the interface may be a video capturing triggering button, and the operation of the user clicking the button may be the user's video capturing triggering operation; on the video playing interface, after receiving the user's video capturing triggering operation, the video capturing window A is superimposed on the video playing interface B. The virtual button "capturing" shown on the interface may be a starting-capturing button, and the operation of the user clicking this button may be the user's video starting-capturing operation. After the operation is received, the capturing of the user's video is started through the video capturing window A, and the function of capturing the user's video based on the original video is realized.

It should be noted that, in practical applications, the specific form of the video playing interface and the form of each button may be configured according to actual needs, and the above example is only an optional implementation. Optionally, the user's video in the embodiment of the present disclosure may be a video containing a user therein, that is, the video may be a video recorded for the user, and certainly, may be a video of another scene recorded by the user after being adjusted as needed.

In an embodiment of the present disclosure, the method may further comprise:
displaying the original video while displaying the user's video through the video capturing window.

In practical applications, when the user's video is being captured, the original video may be in a state of being played, that is, the user's video may be recorded while the original video being played, such that the effect of playing while recording can be achieved. Of course, the original video may also be paused at a certain video frame image while the user's video being captured, based on actual needs.

In an optional solution, if the original video is in the state of being played before the user's video capturing operation is received through the video playing interface of the original video, the original video may be automatically paused and the video capturing window may be displayed on the video playing interface when the user's video capturing operation is received, then the recording of the user's video is started while the playing of the original video is restored. Certainly, the video capturing window also may be displayed on the video playing interface when the user's video capturing operation is received after the user pauses the original video, then the recording of the user's video is started while the playing of the original video is restored.

In practical applications, the video capturing window may be superimposed (superimposedly displayed) on or laid over a preset position on the video playing interface, where the preset position may be a pre-configured display position based on the display interface size of the user's electronic device, for example, the preset position may be the upper left of the video playing interface. The size of the video capturing window is smaller than the display window of the original video, such that the video capturing window only blocks part of the image content of the original video. Wherein, the initial size of the video capturing window may be configured according to actual needs, such that the occlusion of the original video image is minimized as much as possible when the original video is played, thereby not affecting the user watching the original video, and not affecting the user watching the recorded image as much as possible while the user's video is captured through the video capturing window. For example, the size of the video capturing window displayed on the electronic device may be automatically adjusted according to the size of the display interface of the user's electronic device, such as the video capturing window being one tenth or one fifth of the display interface of the electronic device.

In the embodiment of the present disclosure, the shape of the video capturing window is not limited, and may include a circle, a rectangle, and other shapes, which may be configured according to actual needs.

In an embodiment of the present disclosure, the method may further comprise:
receiving a window movement operation of the user for the video capturing window; and
in response to the window movement operation, adjusting the video capturing window to a corresponding area on the video playing interface.

Wherein, the user may adjust the position of the video capturing window to meet the needs of different users for the position of the video capturing window on the video playing interface. In actual applications, optionally, the video capturing window position may be adjusted with any of the following types of user's window movement operations:

First type: the user may adjust the position of the video capturing window by dragging the video capturing window with operating objects (e.g. fingers). The operating objects touching and dragging the video capturing window indicates that the position of the video capturing window is adjusted, and when the operating objects leave from the video capturing window (i.e. stopping dragging the video capturing window), the position where the dragging is stopped is the corresponding area in which the video capturing window locates on the video playing interface.

Second type: the user may adjust the position of the video capturing window through a position progress bar displayed on the video playing interface, and the user may determine the corresponding area where the video capturing window locates on the video playing interface by sliding the position progress bar.

In an embodiment of the present disclosure, the method may further comprise:
displaying a pre-configured window adjustment boundary line on the video playing interface in response to the window movement operation, wherein the window adjustment boundary line may be used to define a display area of the video capturing window;
determining the current display area of the video capturing window according to the window movement operation and the window adjustment boundary line; and
adjusting the video capturing window to a corresponding position on the video playing interface according to the current display area.

Wherein, the video playing interface may have a pre-configured window adjustment boundary line, and the window adjustment boundary line may be used to define a display area where the video capturing window locates on the video playing interface. In practical applications, the window adjustment boundary line may be pre-configured based on various display interface sizes of different electronic devices, such that the contents captured in the video capturing window may be adapted to be displayed on the display interface of any electronic device. Based on the window adjustment boundary line configuration, when the user's window movement operation is received, the pre-configured window adjustment boundary line is simultaneously displayed on the video playing interface, such that there is adjustment basis for adjusting the video capturing window when the user adjusts the video capturing window.

The window adjustment boundary line may be used to define the adjustment range of the video capturing window on the video playing interface. In practical applications, it may be configured according to the needs. For example, the window adjustment boundary line may be a guide line located at a pre-configured position on the video playing interface, and the pre-configured position may comprise at least one position of a top, a bottom, a left side, and a right side of the video playing interface, and the guide lines at different positions may define the adjustment range of the corresponding position of the video capturing window on the video playing interface.

Figure 3:
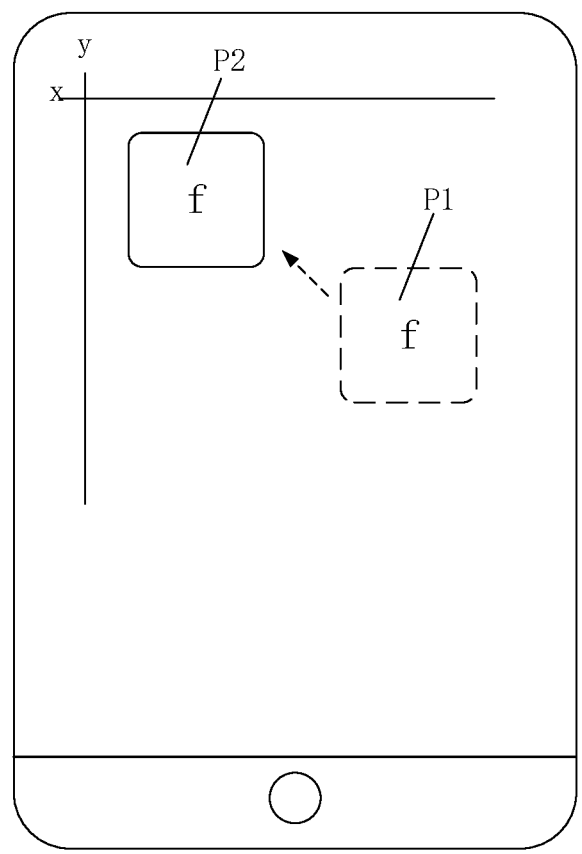
FIG. 3 is a schematic diagram of still another video playing interface according to an embodiment of the present disclosure.

As shown in the schematic diagram of a video playing interface in FIG. 3, two guide lines at the top and the left of the video playing interface are taken as the window adjustment lines (i.e., the window adjustment boundary lines x and y). The user may trigger the window adjustment operation by dragging the video capturing window f. When the operation is received, the window adjustment boundary lines a and b are displayed on the video playing interface. In this example, the user may drag the video capturing window f from the position P1 to the position P2. Based on the position P2, the video capturing window f may be adjusted to a position on the video playing interface, corresponding to the position P2, to realize the adjustment of the video capturing window.

In an embodiment of the present disclosure, determining the current display area of the video capturing window according to the window movement operation and the window adjustment boundary line may comprise:
determining a first display area of the video capturing window according to a window movement operation;
if the distance between the first display area and any of the window adjustment boundary lines is not less than a set distance, it is determined that the first display area is the current display area; and
if the distance between the first display area and any of the window adjustment boundary lines is less than the set distance, it is determined that the second display area is the current display area,
wherein, the second display area is an area in which the first display area is shifted to any of the window adjustment boundary lines, and at least one position point of the second display area coincides with any of the window adjustment boundary lines.

Wherein, the video capturing window has a relatively better display position within the adjustment range limited by the window adjustment boundary line, such as a display area close to the window adjustment boundary line. During the process in which the user adjusts the video window adjustment, except for the user who has requirement for the display area of the video capturing window above the window playing interface, the user cannot accurately acquire a relative better display position, then the distance between the display area of the video capturing window and the window adjustment boundary line during the adjustment is helpful for the user adjusting the video capturing window to a relatively better position on the video playing interface.

In one or more embodiments of present disclosure, during the adjustment of the video capturing window, when the distance between the first display area of the video capturing window and any of the window adjustment boundary lines is not less than the set distance, it indicates that the user may wish to adjust the video capturing window to the display position of the non-edge area of the video playing interface, then the first display area may be used as an area to which the video capturing window is to be adjusted, that is, the current display area. When the distance between the first display area and any of the window adjustment boundary lines is less than the set distance, it indicates that the user may wish to adjust the video capturing window to the edge area of the video playing interface to occlude the playing interface of the original video as little as possible. At this time, the current display area may be determined as the second display area at the boundary line.

In practical applications, if the video capturing window is a rectangle and the window adjustment boundary lines are straight lines, the first display area is a rectangle, and the area in which the first display area is shifted to any of the window adjustment boundary lines is the corresponding area in which the any of boundary lines of the first display area coincides with any of window adjustment boundary lines; if the video capturing window is circular and the window adjustment boundary lines are straight lines, the first display area is a circle, and the area in which the first display area is shifted to any of the window adjustment boundary lines is a corresponding area in which at least one position point of the first display area coincides with any of the window adjustment boundary lines. It can be understood that when there is an adjustment boundary line, no matter how the capturing window is adjusted, the display area of the capturing window cannot exceed the boundary line.

In an embodiment of the present disclosure, the method may further comprise:
receiving a window size adjustment operation of the user for the video capturing window; and
adjusting the video capturing window to a corresponding display size, in response to the window size adjustment operation.

Wherein, the size of the video capturing window may be set according to the pre-configured default value, or the size of the video capturing window may be adjusted by the user based on the user's actual needs. In practical applications, the video playing interface comprises a related triggering identifier for triggering the window size adjustment operation, such as a specifying triggering button or an input box, or may also be a user's voice; in one or more embodiments of present disclosure, the triggering identifier may be a virtual button "window" displayed on the video playing interface, and the user may trigger the window size adjustment operation by using the button. The adjustment of the video capturing window size may be realized by the operation.

In step S130, the user's video and the original video may be combined to obtain a combined video.

Wherein, the video comprises video frame images (video frames) and audio information. In the process of combining the user's video with the original video, the corresponding video frame images and audio information of the two videos may be separately combined (in a superimposition manner). Finally, all video frame images and all audio information which have been combined are re-combined into a combined video.

In the embodiment of the present disclosure, the user's video and the original video may be combined according to a preset combining manner to obtain the combined video, wherein the preset combining manner comprises synchronous combining or asynchronous combining.

In the embodiment of the present disclosure, when the combining manner is synchronous combining, the video frame images and the audio information of the captured user's video may be respectively combined with the video frame images and the audio information of the original video being played at the capturing moment in the capturing process of recording the user's video, thus the video frame images and the audio information of the combined video at the corresponding moment are obtained, and after the capturing of the user's video is completed, all video frame images and all audio information of the original video are combined to obtain a combined video.

In other words, while recording the user's video, the user combines the video frame images of the recorded user's video with the video frame images of the original video corresponding to the capturing moment while capturing the video frame image, and combines the audio information of the recorded user's video with the audio information of the original video corresponding to the capturing moment while capturing the video frame image, and the video frame images and the audio information corresponding to the corresponding moment in the combined video are obtained, and when the capturing of the user's video is completed, the video frame images and audio information corresponding to all the moments are combined to obtain the final combined video.

When the combining manner is asynchronous combining, the user's video and the original video may be combined after the recording of the user's video is completed, to obtain a combined video.

In other words, in the process of capturing the user's video through the video capturing window, without combining the video, the recorded user's video may be saved first, and when the recording of the user's video is completed, the video frame images and audio information of the saved user's video are separately combined with the video frame images and audio information of the original video to obtain a final combined video.

In an embodiment of the present disclosure, among the video frame image of the above combined video, the video frame images in the user's video are displayed on the video frame images in the original video.

It should be noted that, in the video generating method provided by the embodiment of the present disclosure, when the original video and the user's video are combined to obtain a combined video, regardless of whether the synchronous combining or the asynchronous combining is used, the video frame images of the user's video are combined with the video frame images of the corresponding original video, and then the audio information corresponding to the video frame images of the user's video is combined with the audio information corresponding to the video frame images of the corresponding original video, and the combined video frame images and corresponding audio information are combined to obtain a combined video. Wherein, optionally, the combining the video frame images with the video frame image, may refer to combining corresponding two video frame images into one frame image, and the video frame image of the user's video in the one combined frame image locates on the video frame image of the original video. Wherein, when the video frame images are combined with the video frames image, the size of the video frame images of the user's video is smaller than the size of the video frame images of the corresponding original video. In one example, for example, the duration of the user's video is 10 s, and the duration of the original video is also 10 s. When the video frame image of the user's video is combined with the video frame image of the corresponding original video, the video frame images of the first second is combined with the video frame image of the first second of the original video, and the obtained video frame image is the video frame image of the first second in the corresponding combined video, and each video frame image in the user's video is combined with each video frame image in the corresponding video to obtain the combined video.

Figure 4:
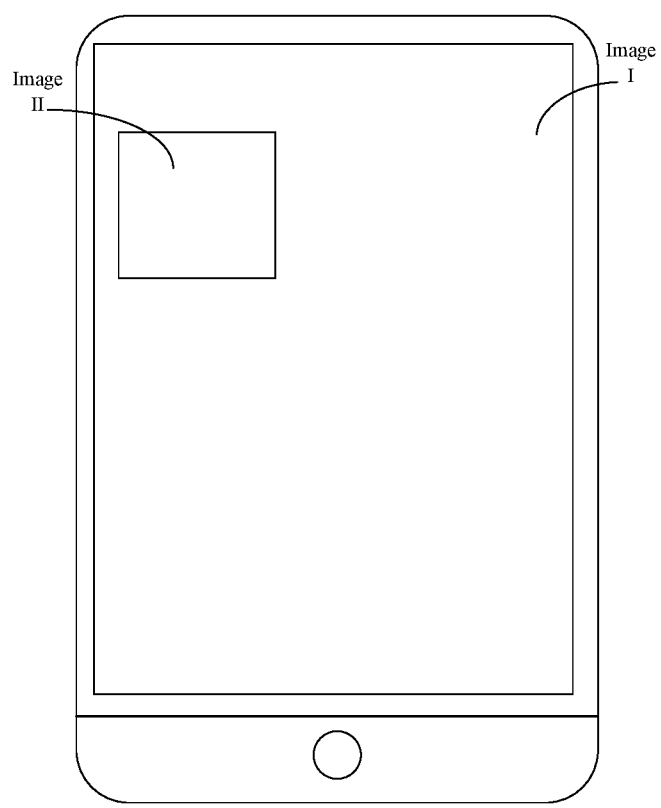
FIG. 4 is a schematic diagram of still another video playing interface according to an embodiment of the present disclosure.

As an example, FIG. 4 shows one video frame image in a combined video obtained by combining one video frame image in a user's video with one video frame image in an original video. As shown in the figure, the image I is a part of the video frame image in the original video, the image II is a part of the video frame image in the user's video, and the image combined by the image I and the image II is the combined video frame image.

In actual applications, based on the display content of the original video, the duration of the user's video recorded by the user may be consistent with the duration of the original video, or may be inconsistent. In order to make the contents of the user's video correspond to the contents in the original video, and further enhance the user's interactive experience, in the embodiment of the present disclosure, if the duration of the user's video is less than the duration of the original video, then the user's video and the original video are combined to obtain a combined video, which may comprise: determining a first video in the original video corresponding to the recording start moment and being consistent with the duration of the user's video according to the recording start moment of the user's video; combining the user's video with the first video to obtain a second video; and obtaining the combined video according to the second video and videos in the original video except for the first video.

In one example, if the duration of the original video is 30 seconds and the recorded user's video is only 20 seconds, then at this time, the video in the original video corresponding to the recording start moment and whose duration is 20 seconds may be determined as the first video according to the recording start moment of the user's video, and then the first video is combined with the user's video to obtain the second video of 20 seconds, and after that the second video is combined with the remaining video of 10 seconds in the original video to finally obtain the combined video whose duration is the same as the original video.

Of course, in actual applications, when the durations of the original video and the user's video are inconsistent, specific combining manners of the two may be configured as needed. For example, in one optional solution, the user's video and the above first video may be combined to obtain the combined video, that is, the video in the original video except for the first video is discarded when combining the original video with the user's video.

In an embodiment of the present disclosure, the method may further comprise:
receiving a user's volume adjustment operation through a video playing interface; and
correspondingly adjusting the volume of the audio information of the original video and/or the audio information of the user's video in response to the volume adjustment operation.

Wherein, in order to further enhance the user's interactive experience, the volume in the original video and/or the user's video may also be adjusted to meet the video play requirements of different users. In actual applications, if the user does not need to adjust the volume of the original video and the user's video, then the volume in the captured user's video may be a pre-configured volume, such as a volume consistent with the volume in the original video, or a preset volume.

In practical applications, the volume may be adjusted through the volume adjustment virtual button on the video playing interface, and the volume adjustment virtual button may be a volume adjustment progress bar. For corresponding to the adjustment of the volume of the original video and the volume of the user's video, two volume adjustment progress bars may be correspondingly configured, such as the volume adjustment progress bar a and the volume adjustment progress bar b, wherein the volume adjustment progress bar a may be used to adjust the volume of the original video, and the volume adjustment progress bar b may be used to adjust the volume of the user's video, and different identifiers are used to distinguish different volume adjustment progress bars.

Figure 5A:
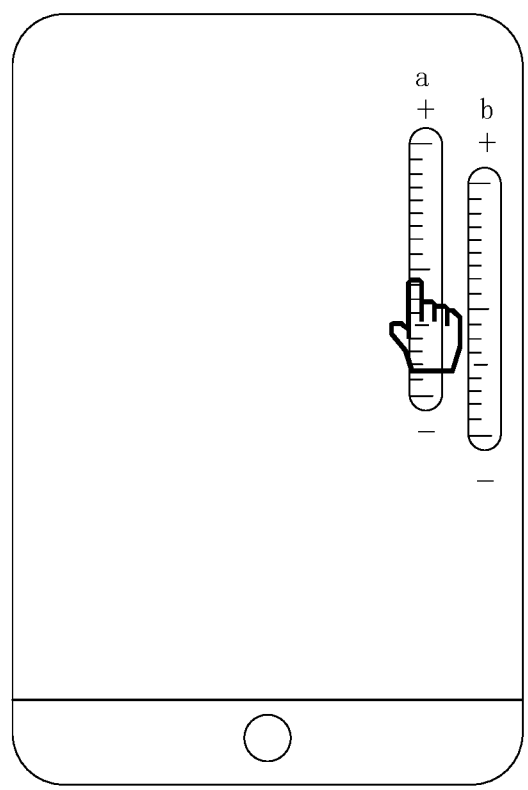
FIG. 5A is a schematic diagram of a volume adjustment manner according to an embodiment of the present disclosure.
Figure 5B:
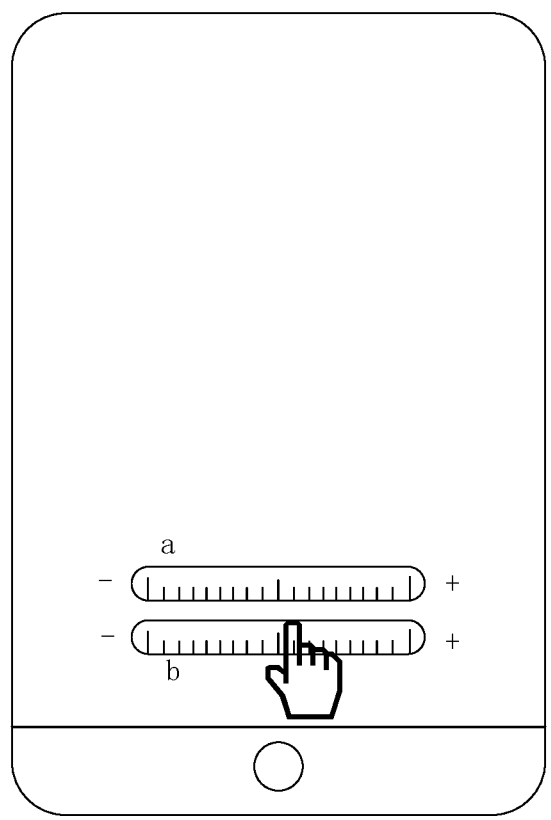
FIG. 5B is a schematic diagram of another volume adjustment manner according to an embodiment of the present disclosure.

As one example, a schematic diagram of a volume adjustment manner is shown in FIG. 5A. The user may adjust the volume by sliding the volume adjustment progress bars a and b which are used to adjust the volume of an original video and that of a user's video respectively, and sliding to the top of the interface (i.e., the "+" identifier direction) indicates that the volume is turned up; sliding to the bottom of the interface (i.e., the "−" identifier direction) indicates that the volume is turned down. According to actual needs, the volume adjustment progress bars a and b may also be set in a horizontal direction, that is, a schematic diagram of the volume adjustment manner as shown in FIG. 5B, sliding to the left of the interface (i.e., the "−" identifier direction) indicates that the volume is turned down, and sliding to the right of the interface (i.e., the "+" identifier direction) indicates that the volume is turned up.

It should be noted that, in actual applications, the volume adjustment interface and the video playing interface may be the same display interface or different display interfaces. If they are different display interfaces, when the user's volume adjustment operation is received through the video playing interface, the volume adjustment interface may be displayed, and the volume adjustment may be performed through the volume adjustment interface. Optionally, in order not to affect the recording and playing of the video, the volume adjustment interface may be superimposed on the video playing interface, such as displayed at the edge position of the video playing interface.

In an embodiment of the present disclosure, the method may further comprise:
receiving a special effect addition operation for the special effect to be added by the user through the video playing interface; and
adding the special effect to be added to the user's video in response to the special effect addition operation.

Wherein, in order to meet the video capturing needs of different users, the user may also be provided with the function of adding a special effect to the user's video, that is, adding a selected special effect to be added to the user's video by the user's special effect addition operation. The special effect to be added may be added before the user's video is captured, or may be added in the process of capturing the user's video, or may be added after the capturing of the user's video is completed, and the timing of adding the special effects is not limited in the present disclosure.

In practical applications, the function of adding a special effect to the user's video may be implemented in at least one of the following types:

First type: the special effect addition function may be implemented through the virtual button "Special effect" displayed on the video playing interface, and the operation of the user clicking the button may be the special effect addition operation for the special effect to be added by the user, and the special effect corresponding to the button is added to the user's video.

Second type: the special effect may be added by sliding the display interface of the user's video. The user may add the corresponding special effects to the user's video by sliding the display interface of the user's video to the left and right with an operation object (e.g. fingers).

In the embodiment of the present disclosure, before capturing the user's video via the video capturing window, the method may further comprise:
receiving a recording selection operation for a user's video recording manner by the user through a video playing interface, and the recording manner comprises at least one of a quick recording, a slow recording, and a standard recording; and
determining the user's video recording manner in response to the recording selection operation.

Wherein, in order to meet the needs of different users, the user may be provided with the function of selecting the recording manner of the user's video before capturing the user's video, that is, recording the user's video according to the selected recording manner through the user's recording selection operation. The recording speed of the quick recording, the recording speed of the standard recording, and the recording speed of the slow recording are sequentially reduced. With the selection of different recording manners, the function of recording the user's video in a variable speed may be realized, thereby further improving the user's interactive experience.

It may be understood that the fast, slow, and standard in the above fast recording, slow recording, and standard recording are relative, and the recording speeds of different recording manners are different, and the recording speed of each recording manner may be configured as needed. For example, the quick recording refers to the recording manner in which the recording speed is the first speed, the slow recording is the recording manner in which the recording speed is the second speed, and the standard recording refers to the recording manner in which the recording speed is the third speed, and the first speed is greater than the third speed, the third speed is greater than the second speed.

In the embodiment of the present disclosure, after the user's video and the original video are combined to obtain a combined video, the method may further comprise:
receiving a user's video save operation and/or video issuing (posting) operation; and
in response to the video save operation, saving the combined video locally, and/or, in response to the video issuing operation, issuing the combined video.

Wherein, after obtaining the combined video, the user may be provided with a function of issuing and/or saving the combined video, that is, the combined video may be issued (posted) to a specified video platform through the user's video issuing operation, so as to realize the sharing of the combined video; or the combined video may be saved locally for viewing by the user through the user's video save operation. In the actual applications, after the combined video is obtained, it may skip to the video issuing interface and receive the user's video issuing operation through the video issuing interface, or the user's video issuing operation may be directly received through the video playing interface, wherein the video issuing operation may be obtained by the user clicking the virtual button "Issue" (or, "Post").

In an embodiment of the present disclosure, issuing the combined video in response to the video issuing operation may comprise:
acquiring the user's combined video viewing permission in response to the video issuing operation; and
issuing the combined video according to the combined video viewing permission.

Wherein, in order to meet the user's privacy requirements for the combined video, the user is provided with a function of configuring the combined video viewing permission, that is, acquiring the user's combined video viewing permission through the user's video issuing operation, and the combined video is issued according to the user's combined video viewing permission. By the combined video viewing permission, the combined video may only be viewed by the user corresponding to the combined video viewing permission, and the user without the combined video viewing permission cannot view the combined video. In actual applications, the combined video viewing permission may be pre-configured, and the combined video viewing permission can be pre-configured for any combined video which needs to be issued; and the combined video viewing permission may also be configured while the current combined video is issued, then correspondingly the current combined video is sued according to the configured privacy permission.

Wherein, the combined video viewing permission comprises at least one of "anyone", "friends", and "self". "Anyone" indicates that the combined video can be viewed by anyone, and "friends" indicates that only the user's friends can view the combined video, and "self" indicates that only the user can view the combined video.

In an embodiment of the present disclosure, the method may further comprise:
generating a push message for a combined video; and
sending the push message to an associated user of the user and/or an associated user of the original video.

Wherein, in order to notify the person associated with the combined video, when issuing the combined video, a push message for the combined video may be generated, by which the associated user of the user and/or the associated user of the original video may know the issuing of the combined video in time. Wherein, the associated user of the user refers to a user that has an association relationship with the user. The involved scope of the association relationship may be configured as needed, for example, may include but not limit to the person followed by the user or the person who follows the user. The associated user of the original video is the user who has the association relationship with the issuer (poster) of the original video, for example, may include but not limit to the issuer of the original video or the person involved in the original video. For example, the original video is a video that has been combined once. The issuer of the original video is a user here named with user1. The author of the initial original video corresponding to the original video before combining is a user here named with user2, and the associated user of the original video may comprise user1 and user2.

In practical applications, when a combined video is issued, relevant attention information may be added to the title of the combined video to indicate by which user the issuing of the combined video is intended to be known, and the receiver of the push information may be embodied by the form of @ a certain user.

In one example, if user1 follows user2, and user1 issues (posts) a combined video, and user1 associates with user2, i.e. user1 @ user2 (wherein, the situation that user1 @ user2 may be displayed in the title of the combined video), the push message for the combined video is sent to user2, such that user2 knows that the user1 has issued the video.

In yet another example, although user1 follows user2 and user1 issues a combined video, but user1 does not @user2, then user2 cannot receive the push message of the combined video.

In yet another example, user1 does not follow user2 and user1 issues the combined video, but user1 @user2 when issuing the combined video, then user2 may receive the push message of the combined video.

In an embodiment of the present disclosure, the method may further comprise: hiding a virtual button of a corresponding function in the video playing interface.

Figure 6A:
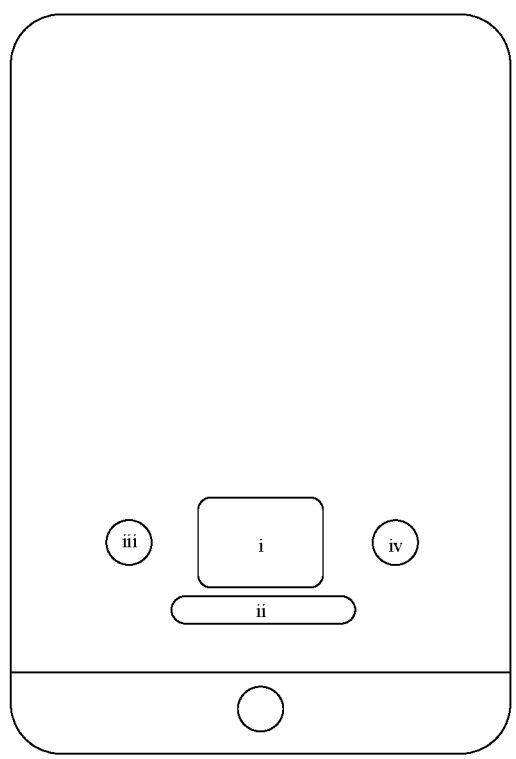
FIG. 6A is a schematic diagram of another video playing interface according to an embodiment of the present disclosure.
Figure 6B:
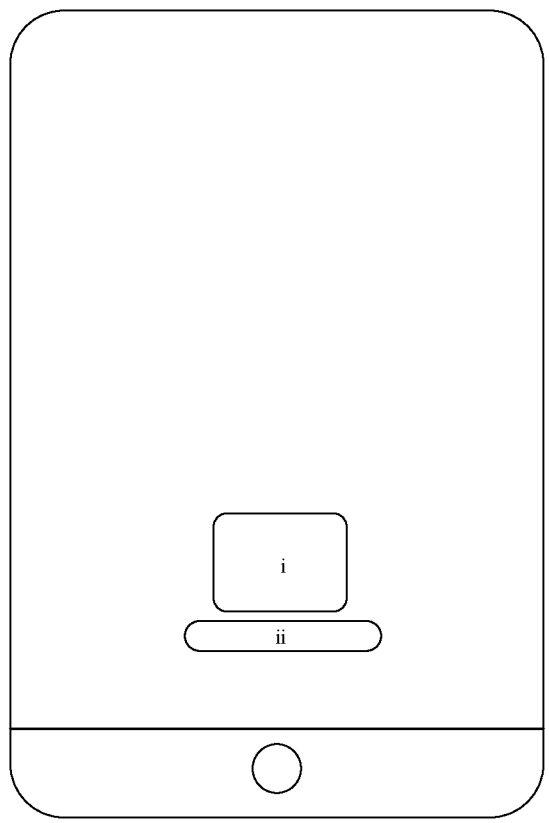
FIG. 6B is a schematic diagram of still another video playing interface according to an embodiment of the present disclosure.

In practical applications, virtual identifiers indicating different functions may be displayed on the video playing interface, for example, a virtual button i indicating the start of the capturing, a progress bar ii indicating the capturing progress, a virtual button iii indicating the addition of the special effect, and a virtual button iv indicating the issue of the combined video and the like. Schematic diagrams of one video playing interface are shown in FIGS. 6A and 6B. In order to further enhance the user's interactive experience, other virtual identifiers on the video playing interface except for the virtual button i and the progress bar ii in FIG. 6A may be hidden, for example, the virtual buttons iii and iv are hidden, and the interface when they are hidden is as shown in FIG. 6B. The hiding of the virtual identifiers may keep the video playing interface clean and tidy.

In actual applications, a virtual button for hiding a function button may also be set on the interface, by which the user may set which function buttons are hidden or displayed. In one or more embodiments of present disclosure, when receiving the user's operation on the button, the user chooses which virtual buttons to be hidden by this button, or to choose to restore and display the previously hidden virtual buttons.

Figure 7:
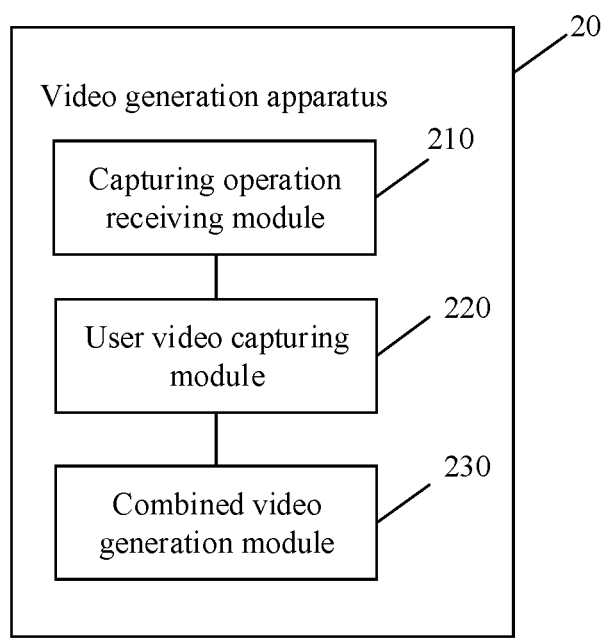
FIG. 7 is a schematic structural diagram of a video generation apparatus according to an embodiment of the present disclosure.

Based on the same principle as the method shown in FIG. 1, a video generation apparatus 20 is further provided in the embodiment of the present disclosure. As shown in FIG. 7, the video generation apparatus 20 may comprise a capturing operation receiving module 210 and a user video capturing module 220 and a combined video generation module 230, wherein,
the capturing operation receiving module 210 is configured to receive a user's video capturing operation through a video playing interface of the original video;
the user video capturing module 220 is configured to superimpose the video capturing window on the video playing interface, capture the user's video, and display the user's video through the video capturing window in response to the video capturing operation; and
the combined video generation module 230 is configured to combine the user's video with the original video to obtain a combined video.

In an embodiment of the present disclosure, the video generation apparatus may further comprise an original video playing module configured to play the original video while displaying the user's video through the video capturing window.

In the embodiment of the present disclosure, the combined video generation module 230 may combine the user's video with the original video according to a preset combining manner to obtain a combined video, wherein the combining manner comprises synchronous combining or asynchronous combining.

In the embodiment of the present disclosure, If the combining manner is synchronous combining, the combined video generation module 230 may combine, in the capturing process of recording the user's video, video frame images and audio information of the captured user's video with the video frames images and the audio information of the original video played at a capturing moment respectively, to obtain video frame images and audio information of the combined video at a corresponding moment, and combine all the video frame images and all the audio information of the combined video after completing the capturing of the user's video to obtain the combined video If the combining manner is asynchronous combining, the combined video generation module 230 may combine all the user's videos with the original video after completing the recording of the user's video to obtain the combined video.

In an embodiment of the present disclosure, the video frame image in the user's video in the video frame image of the combined video is displayed above the video frame image in the original video.

In an embodiment of the present disclosure, the apparatus 20 may further comprise a volume adjustment module configured to receive a user's volume adjustment operation through the video playing interface, and correspondingly adjust the volume of the audio information of the original video and/or the audio information of the user's video according to the volume adjustment operation.

In the embodiment of the present disclosure, if a duration of the user's video is less than a duration of the original video, the combined video generation module may be configured to determine according to the recording start moment of the user's video, a first video in the original video corresponding to a recording start moment and being consistent with the duration of the user's video, combine the user's video with the first video to obtain a second video, and obtain the combined video according to the second video and videos except for the first video in the original video.

The video generation apparatus 20 of this embodiment may perform a method for adding special effect to video provided by an embodiment of the present disclosure, and the implementation principles thereof are similar, and details are not described herein again.

It can be understood that the actions performed by the respective modules in the video generation apparatus in the embodiments of the present disclosure correspond to the steps in the video generating method in the embodiments of the present disclosure. Detailed description of the function of each module of the video generation apparatus may refer to the corresponding description of the video generating method shown in the foregoing, and details are not described herein again.

Based on the same principles as the video generating method of the embodiment of the present disclosure, an embodiment of the present disclosure further provides an electronic device, which may include, but is not limited to, a processor and a memory, wherein the memory may be used to store computer operation instructions; the processor may be to execute the video generating method of the present disclosure by calling the computer operation instructions, and details are not described herein again.

Based on the same principle as the video generating method of the embodiment of the present disclosure, the embodiments of the present disclosure also provides a computer storage medium storing at least one instruction, at least one program, a code set, or a set of instructions, which are loaded and executed by a computer to execute the video generating method of the present disclosure, and details are not described herein again.

Figure 8:
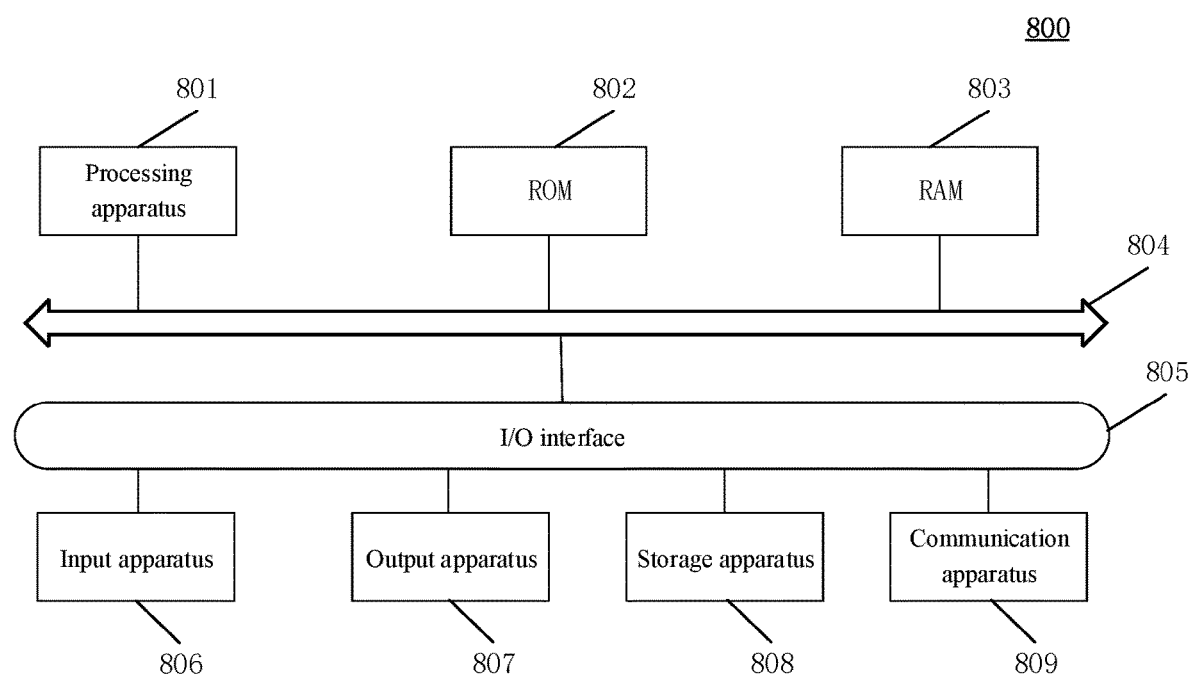
FIG. 8 is a schematic structural diagram of an electronic device according to an embodiment of the present disclosure.

Further referring to FIG. 8, it shows a structural diagram suitable for implementing an electronic device 800 of an embodiment of the present disclosure, for example, the electronic device may be a terminal device. Wherein, the terminal device may include, but is not limited to a mobile terminal, such as a mobile phone, a notebook computer, a digital broadcast receiver, a PDA (Personal Digital Assistant), a PAD (Tablet), a PMP (Portable Multimedia Player), an in-vehicle terminal (for example, a car navigation terminal) and the like, as well as a fixed terminal such as digital TV, a desktop computer and the like. The electronic device shown in the FIG. 8 is merely one example, and should not construct any limitation on the function and scope of use of the embodiments of the present disclosure.

As shown in FIG. 8, the electronic device 800 may comprise a processing apparatus (e.g., a central processing unit, a graphics processor, etc.) 801 that may execute various actions and processing according to the program stored in the read-only memory (ROM) 802 or program loaded from a storage apparatus to the random access memory (RAM) 803. The RAM 803 also stores various programs and data required for the operation of the electronic device 800. The processing apparatus 801, the ROM 802, and the RAM 803 are connected to each other through a bus 804. An input/output (I/O) interface 805 is also connected to the bus 804.

In general, the following apparatus may be connected to the I/O interface 805: an input apparatus 806 including, for example, a touch screen, a touch pad, a keyboard, a mouse, a camera, a microphone, an accelerometer, a gyroscope and the like; an output apparatus 807 including, for example, a liquid crystal display (LCD), a speaker, a vibration and the like; a storage 808 including, for example, a magnetic tape and a hard disk and the like; and a communication apparatus 809. The communication apparatus 809 may allow the electronic device 800 to communicate wirelessly or by wire with other devices to exchange data. Although FIG. 8 illustrates an electronic device 800 having various apparatus, it should be understood that it is not required to implement or have all of the illustrated devices. Alternatively, more or less devices may be implemented.

In particular, the processes described above with reference to the flowcharts may be implemented as a computer software program according to an embodiment of the present disclosure. For example, an embodiment of the present disclosure comprises a computer program product comprising a computer program loaded on a computer readable medium, and the computer program contains program codes for executing the method shown in the flowchart. In such an embodiment, the computer program may be downloaded and installed from the network via the communication apparatus 809, or installed from the storage apparatus 808, or installed from the ROM 802. When the computer program is executed by the processing apparatus 801, the above functions defined in the method of the embodiments of the present disclosure are executed.

It should be noted that the above computer readable medium of the present disclosure may be a computer readable signal medium or a computer readable storage medium or any combination of the above two. The computer readable storage medium may be, for example, but is not limited to, an electronic, magnetic, optical, electromagnetic, infrared, or semiconductor system, apparatus, or device, or any combination of the above. More specific examples of the computer readable storage media may include, but are not limited to, electrical connections having one or more wires, portable computer disks, hard disks, random access memory (RAM), read only memory (ROM), erasable programmable read only memory (EPROM or flash memory), optical fiber, portable compact disk read only memory (CD-ROM), optical storage device, magnetic storage device, or any suitable combination of the above. In the present disclosure, a computer readable storage medium may be any tangible medium that may contain or store programs, which may be used by or in connection with an instruction execution system, apparatus, or device. In the present disclosure, a computer readable signal medium may comprise a data signal that is propagated in the baseband or propagated as part of a carrier, carrying computer readable program codes. Such propagated data signals may take various forms, which includes, but is not limited to, electromagnetic signals, optical signals, or any suitable combination of the above. The computer readable signal medium may also be any computer readable medium except for a computer readable storage medium, and the computer readable signal medium may transmit, propagate or transport a program for use by or in connection with an instruction execution system, apparatus or device. Program codes contained on the computer readable medium may be transmitted by any suitable medium, which includes but is not limited to: wire, fiber optic cable, RF (radio frequency), and the like, or any suitable combination of the above.

The above computer readable medium may be contained in the above electronic device; or may be separately present and is not incorporated in the electronic device.

The computer readable medium carries one or more programs, when the one or more programs are executed by the electronic device, causing the electronic device to: acquire at least two internet protocol addresses; and send the node evaluation request including at least two internet protocol addresses to the node evaluation device, wherein the node evaluation device selects and return an internet protocol address from the at least two internet protocol addresses; receive the internet protocol address returned by the node evaluation device; wherein the acquired internet protocol address indicates the edge nodes in the content distribution network.

Or, the computer readable medium carries one or more programs, when the one or more programs are executed by the electronic device, causing the electronic device to: receive a node evaluation request including at least two internet protocol addresses; select the internet protocol address from the at least two internet protocol addresses, and return the selected internet protocol address; wherein the received internet protocol address indicates an edge node in the content distribution network.

Computer program codes for executing the operations of the present disclosure may be written in one or more programming languages, or combinations thereof, wherein the programming languages comprises an object-oriented programming language such as Java, Smalltalk, C++, and also comprises conventional procedural programming language—such as "C" language or similar programming languages. The program codes may be executed entirely on the user's computer, partly executed on the user's computer, executed as an independent software package, partly executed on the user's computer and partly executed on the remote computer, or entirely executed on the remote computer or on the server. In the case of involving the remote computer, the remote computer may be connected to the user's computer through any kind of network, including a local area network (LAN) or a wide area network (WAN), or may be connected to an external computer (e.g., using an Internet service provider to connect via Internet).

The flowchart and block diagrams in the drawings illustrate the architecture, function, and operation of possible implementations of systems, methods, and computer program products according to various embodiments of the present disclosure. In this regard, each block of the flowchart or block diagram may represent one module, a program segment, or a portion of the codes, and the module, the program segment, or the portion of codes comprises one or more executable instructions for implementing the specified logic functions. It should also be noted that in some alternative implementations, the functions noted in the blocks may also occur in an order different from the order noted in the drawings. For example, two successively represented blocks may in fact be executed substantially in parallel, and they may sometimes be executed in the opposite order, depending upon the involved function. It is also noted that each block of the block diagrams and/or flowcharts, and combinations of blocks in the block diagrams and/or flowcharts, may be implemented in a dedicated hardware-based system that executes the specified functions or operations, or it may be implemented by a combination of dedicated hardware and computer instructions.

The above description is only a preferred embodiment of the present disclosure and a description of the principles of the applied technology. It should be understood by those skilled in the art that the disclosure scope of the present disclosure is not limited to the specific technical solutions of the above technical features, and should also cover other technical solutions formed by the random combination of the above technical features or equivalent features thereof without departing from the above disclosed concept, such as a technique solution in which the above features are replaced with technical features having similar functions disclosed (but is not limited) in the present disclosure.

What is claimed is:

1. A video generating method, comprising:
   receiving a user's video capturing operation through a video playing interface of an original video;
   in response to the video capturing operation, superimposing a video capturing window on the video playing interface, capturing the user's video, and displaying the user's video through the video capturing window;
   combining the user's video with the original video to obtain a combined video;
   wherein the user's video and the original video are combined in a combining manner to obtain the combined video, and wherein the combining manner comprises synchronous combining or asynchronous combining;
   when the combining manner is synchronous combining, during capturing of the user's video, combining video frame images and audio information of the user's video with video frame images and audio information of the original video being played at a capturing time, respectively, to obtain video frame images and audio information of the combined video at the corresponding moment, and combining all the video frame images and all the audio information of the combined video after completing the capturing of the user's video to obtain the combined video; and
   when the combining manner is asynchronous combining, combining the user's video with the original video after completing the capturing of the user's video to obtain the combined video.

2. The video generating method according to claim 1, further comprising:
   playing the original video while displaying the user's video through the video capturing window.

3. The video generating method according to claim 1, wherein, among the video frame images of the combined video, the video frame images of the user's video are displayed on the video frame images of the original video.

4. The video generating method according to claim 1, further comprising:
   receiving a user's volume adjusting operation through the video playing interface; and
   adjusting a volume of the audio information of the original video and/or the audio information of the user's video correspondingly in response to the volume adjustment operation.

5. The video generating method according to claim 1, wherein when a duration of the user's video is less than a duration of the original video, the combining the user's video with the original video to obtain a combined video comprises:
   determining, in the original video, according to a capturing start moment of the user's video, a first video corresponding to the capturing start moment and being consistent with the duration of the user's video;
   combining the user's video with the first video to obtain a second video; and
   obtaining the combined video according to the second video and videos except for the first video in the original video.

6. An electronic device comprising:
   a processor and a memory, wherein, the memory is configured to store computer operation instructions;

and the processor is configured to execute a video generating method by calling the computer operation instructions, the video generating method comprises:

receiving a user's video capturing operation through a video playing interface of an original video;

in response to the video capturing operation, superimposing a video capturing window on the video playing interface, capturing the user's video, and displaying the user's video through the video capturing window;

combining the user's video with the original video to obtain a combined video;

wherein the user's video and the original video are combined in a combining manner to obtain the combined video, and wherein the combining manner comprises synchronous combining or asynchronous combining;

when the combining manner is synchronous combining, during capturing of the user's video, combining video frame images and audio information of the user's video with video frame images and audio information of the original video being played at a capturing time, respectively, to obtain video frame images and audio information of the combined video at the corresponding moment, and combining all the video frame images and all the audio information of the combined video after completing the capturing of the user's video to obtain the combined video; and when the combining manner is asynchronous combining, combining the user's video with the original video after completing the capturing of the user's video to obtain the combined video.

7. The electronic device according to claim 6, the video generating method further comprises:

playing the original video while displaying the user's video through the video capturing window.

8. The electronic device according to claim 6, the video generating method further comprises:

receiving a user's volume adjusting operation through the video playing interface; and adjusting a volume of the audio information of the original video and/or the audio information of the user's video correspondingly in response to the volume adjustment operation.

9. The electronic device according to claim 6, wherein when a duration of the user's video is less than a duration of the original video, the combining the user's video with the original video to obtain a combined video comprises:

determining according to a capturing start moment of the user's video, a first video corresponding to the capturing start moment and being consistent with the duration of the user's video in the original video;

combining the user's video with the first video to obtain a second video; and obtaining the combined video according to the second video and videos except for the first video in the original video.

10. A non-transitory computer readable storage medium, the computer readable storage medium stores at least one instruction, at least one program, a code set, or a set of instructions, the at least one instruction, the at least one program, the code set or the set of instructions is loaded and executed by a computer to implement a video generating method comprising:

receiving a user's video capturing operation through a video playing interface of an original video;

in response to the video capturing operation, superimposing a video capturing window on the video playing interface, capturing the user's video, and displaying the user's video through the video capturing window;

combining the user's video with the original video to obtain a combined video;

wherein the user's video and the original video are combined in a combining manner to obtain the combined video, and wherein the combining manner comprises synchronous combining or asynchronous combining;

when the combining manner is synchronous combining, during capturing of the user's video, combining video frame images and audio information of the user's video with video frame images and audio information of the original video being played at a capturing time, respectively, to obtain video frame images and audio information of the combined video at the corresponding moment, and combining all the video frame images and all the audio information of the combined video after completing the capturing of the user's video to obtain the combined video; and when the combining manner is asynchronous combining, combining the user's video with the original video after completing the capturing of the user's video to obtain the combined video.

11. The non-transitory computer readable storage medium according to claim 10, the video generating method further comprising:

playing the original video while displaying the user's video through the video capturing window.

12. The non-transitory computer readable storage medium according to a claim 10, wherein, among the video frame images of the combined video, the video frame images of the user's video are displayed on the video frame images of the original video.

13. The non-transitory computer readable storage medium according to claim 10, the video generating method further comprising:

receiving a user's volume adjusting operation through the video playing interface; and adjusting a volume of the audio information of the original video and/or the audio information of the user's video correspondingly in response to the volume adjustment operation.

14. The non-transitory computer readable storage medium according to claim 10, wherein when a duration of the user's video is less than a duration of the original video, the combining the user's video with the original video to obtain a combined video comprises:

determining according to a capturing start moment of the user's video, a first video corresponding to the capturing start moment and being consistent with the duration of the user's video in the original video;

combining the user's video with the first video to obtain a second video; and obtaining the combined video according to the second video and videos except for the first video in the original video.

* * * * *